Oct. 6, 1964  T. F. RISTAU  3,151,697
POWER STEERING APPARATUS
Filed Sept. 18, 1961  3 Sheets-Sheet 1

INVENTOR.
Theodore F. Ristau
BY
Bryce Beecher
ATTORNEY

Oct. 6, 1964 T. F. RISTAU 3,151,697
POWER STEERING APPARATUS
Filed Sept. 18, 1961 3 Sheets-Sheet 3

INVENTOR.
Theodore F. Ristau
BY
Bryce Beecher
ATTORNEY

3,151,697
POWER STEERING APPARATUS
Theodore F. Ristau, Saginaw, Mich., assignor to General Motors Corporation, Detroit, Mich., a corporation of Delaware
Filed Sept. 18, 1961, Ser. No. 138,656
2 Claims. (Cl. 180—79.2)

This invention relates to the power steering of automotive vehicles and more particularly pertains to an hydraulic power steering gear in which the usual solid linkage constituting the feed-back to the control valve is dispensed with in favor of a flexible connection.

In specialized vehicles, particularly, such linkage must often be quite complicated because of the relative disposition of the valve and the steered part to which it is required to be connected.

In accordance with the present invention the problem is solved through the use of a flexible connection, most preferably a cable having a suitable sheath preventing buckling of the cable. When this is done, the vehicle parts presenting the interference between the parts desired to be interconnected are easily circumvented.

A feature of the invention resides in the fact that with the sheathed cable any hunting type oscillations of the valve as heretofore experienced with solid linkages are prevented. This apparently owes to the inherent friction in the cable-sheath system which serves effectively to damp out such oscillations and the wheel shimmy resulting therefrom.

The invention will be described with the aid of the accompanying drawings in which.

Figure 1:
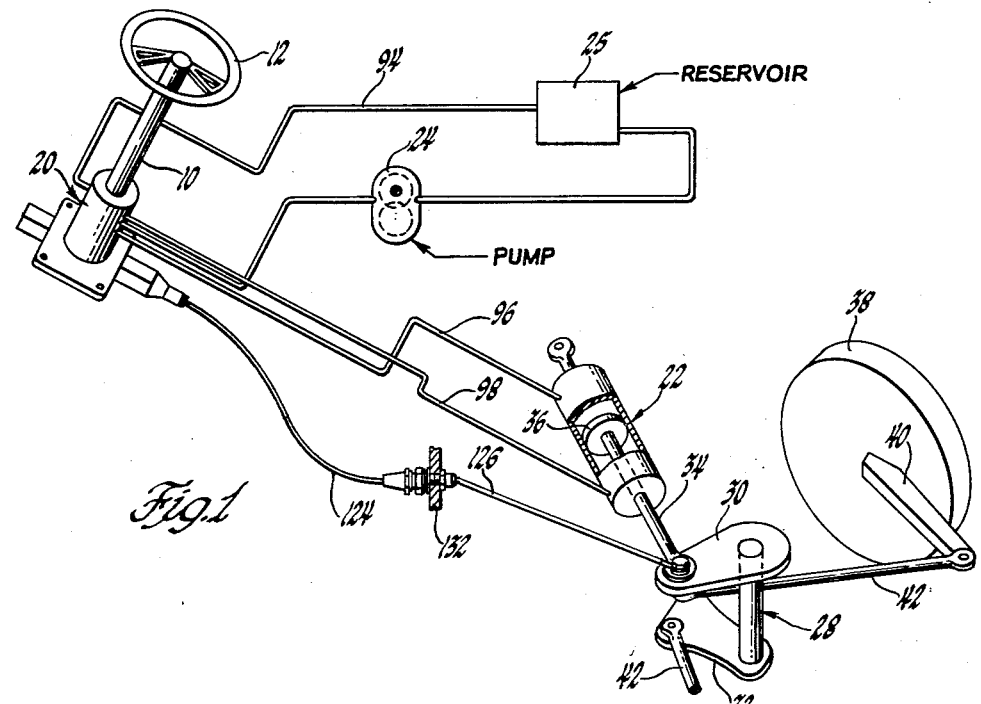
FIGURE 1 is a diagrammatic representation in perspective of the over-all system.

Referring first to FIGURE 1, there will be seen the usual steering column 10 at the top of which is mounted a conventional steering wheel 12. Within the column 10 is a steering shaft 14, seen in FIGURE 3 as connected through a friction-type clutch 16 with a stub shaft 18 comprised in the valve structure 20.

Valve 20 controls the flow of fluid to and from a fluid motor 22, the cylinder component of which is adapted for connection to a fixed member, normally the frame of the vehicle. The necessary fluid pressure required for the operation of the motor is generated by a pump 24 drawing from a reservoir 25.

In the case of the particular vehicle, the steering is accomplished through a bell crank device 28 having upper and lower components 30 and 32. The shaft 34 of the piston 36 of the fluid motor will be seen as having pivotal connection with the component 30. Movement imparted through the bell crank device is translated to the dirigible wheels 38 via steering knuckle arms 40 and tie rods 42 which pivotally connect to the lower component 32 of the bell crank device.

Figure 3:
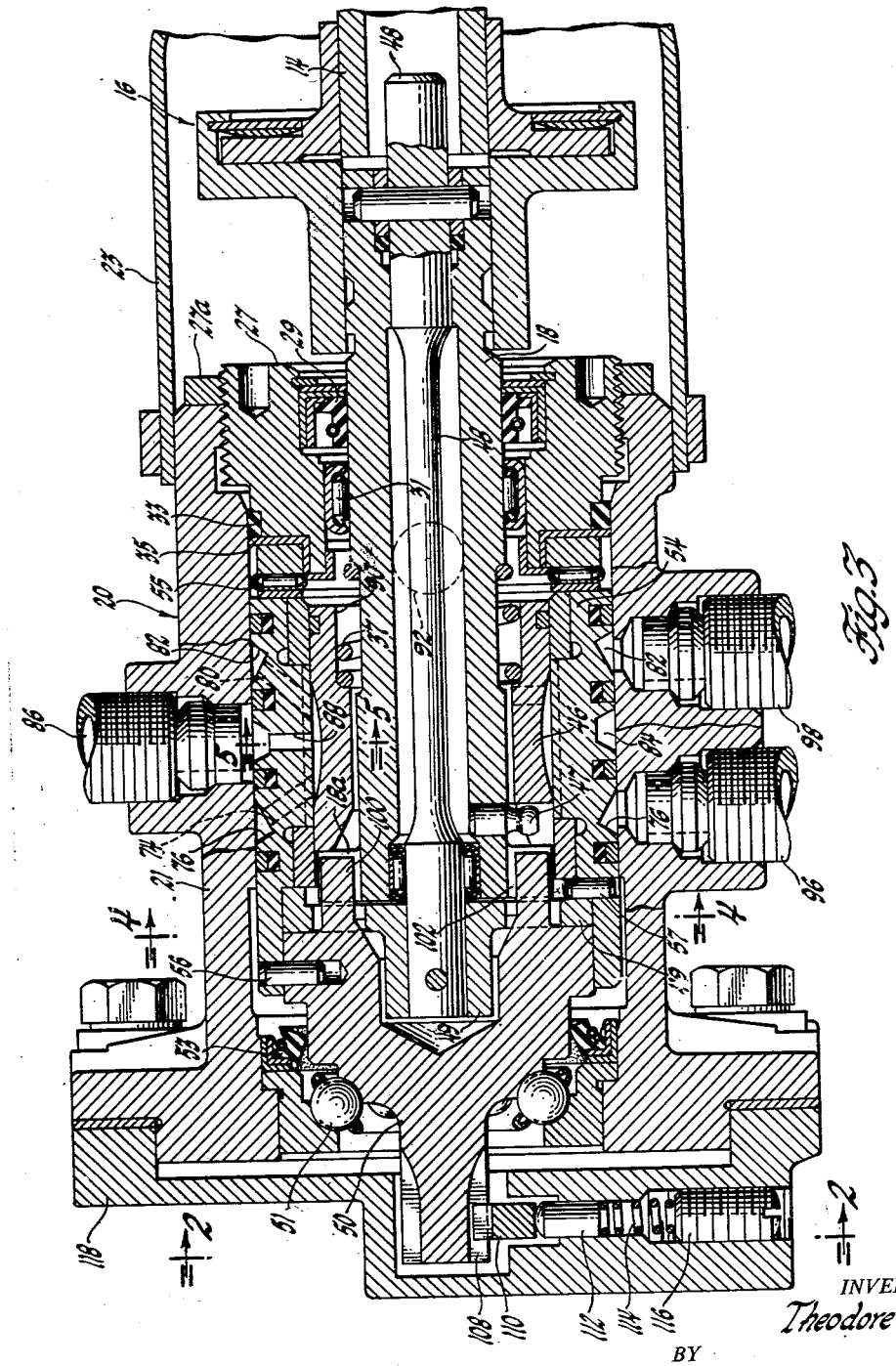
FIGURE 3 is a longitudinal section of the control valve preferably used in the practice of the invention.

Going now to FIGURE 3, the valve there disclosed accords in principle with that described in the copending application of William B. Thompson and Philip B. Zeigler, Serial No. 762,153, filed September 19, 1958 now Patent No. 3,022,772. The valve comprises a housing 21 suitably fixedly connected to the housing 23 for the friction clutch 16. Inward of the friction clutch is a closure 27 threaded into the housing 21 and formed to accommodate a seal 29 and roller bearings 31 for the stub shaft 18. Closure 27 is secured against loosening by a lock ring 27a and within the valve body is recessed to seat a seal 33 located by a retainer 35.

Confined within the valve body are inner and outer sleeve elements 46 and 54, respectively. The inner sleeve element has a slot therein for the accommodation of a ball head pin 47 through which it makes connection with the stub shaft 18. A spring 37 acts to bias the sleeve 46 in the direction toward the ball head pin. The stub shaft 18 has pinned thereto at its right end the corresponding end of a torsion rod 48 pinned at its opposite end to a connector 49. This annular member is slotted to accommodate a pin 57 staked in the sleeve 54. The latter will be seen as pinned (56) to the pinion carrier 50 for rotation therewith. The pinion carrier turns in ball bearings 51 located outwardly of a lip seal 53. The necessary thrust bearings for the sleeves 46 and 54 will be seen at 55, the same being located by the closure 27.

Turning of the stub shaft 18 is marked by twisting of the torsion rod 48 which serves to provide an artificial steering "feel." Additionally, the torsion bar operates to return the inner sleeve 46 and the stub shaft 18 to their normal position once the turning force imposed on the stub shaft has been removed.

Figure 5:
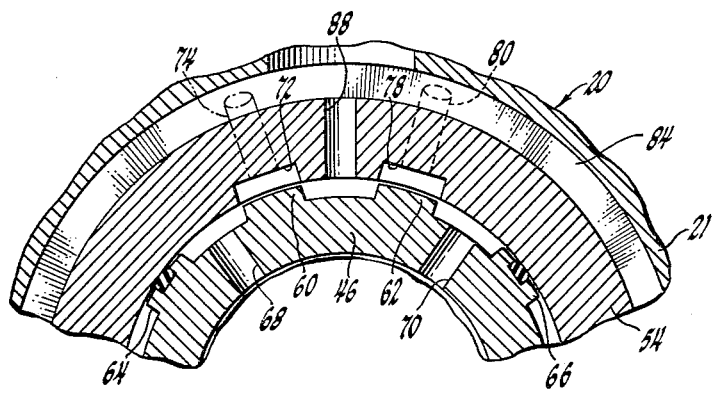
FIGURE 5 is a section on the line 5—5 in FIGURE 3.

The working relationship of the two sleeve elements 46 and 54 will be best understood by reference to FIGURE 5 taken with FIGURE 3. From FIGURE 5 it will be observed that the sleeve 46 is provided with control lands 60 and 62 and sealing lands 64 and 66. Additionally, such sleeve comprises ports 68 and 70, port 68 being located between control land 60 and sealing land 64, port 70 being located between control land 62 and sealing land 66.

Land 60 is functional with respect to a channel 72 formed internally of the outer sleeve 54 and opening to a port 74 therein in turn opening to an annular groove 76 located about the periphery of the sleeve. Similarly, land 62 of the inner sleeve 46 is functional with respect to a channel 78 in the outer sleeve 54. Such channel communicates with a port 80 in turn communicating with an annular groove 82 about the periphery of the sleeve 54. Between the annular grooves 76 and 82, as seen in FIGURE 3, will be seen a third annular groove 84. Annular grooves 76 and 82 open to power lines 96 and 98, respectively, while groove 84 is at all times in communication with the pressure line 86.

Returning to the inner sleeve 46, it is to be noted that the ports 68 and 70 therein open to the spring cavity 90 which communicates with an exhaust port 92. The latter port opens to the return line 94, seen in FIGURE 1.

With the sleeve elements in their centered position as shown (FIG. 5), such position corresponding to the straight-ahead position of the dirigible wheels 38, the pressure fluid provided by the pump passes through the valve against the static pressure of the fluid in the power lines 96 and 98 and back to the reservoir 25.

Figure 4:
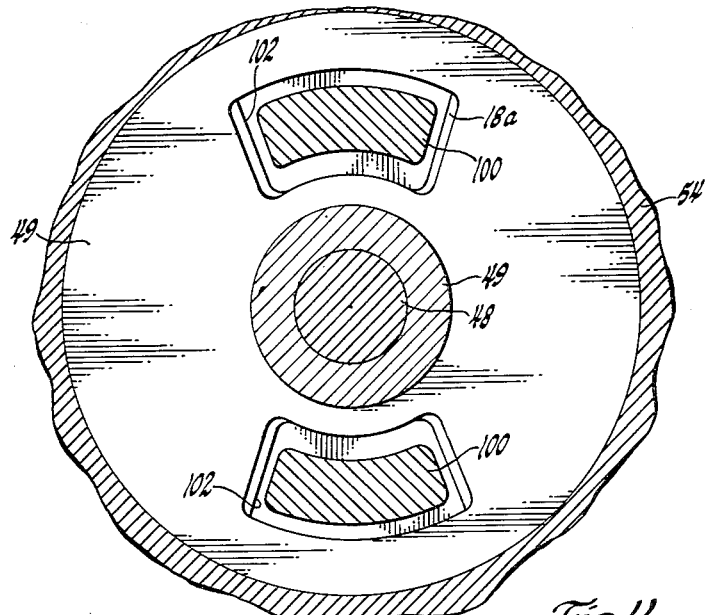
FIGURE 4 is a section on the line 4—4 in FIGURE 3.

Reverting to the pinion carrier 50, it is to be brought out that the same inwardly of the valve body terminates in a yoke 100 (FIGURE 4) accommodated with clearance in slots 102 contained in an enlarged portion 18a of the stub shaft 18. It should be immediately recognized that the distance between the walls of the slots and the side walls of the yoke limit the extent to which the torsion rod 48 may twist, since once the clearance has been taken up the stub shaft and carrier rotate as one. Normally this does not occur.

Figure 1A:
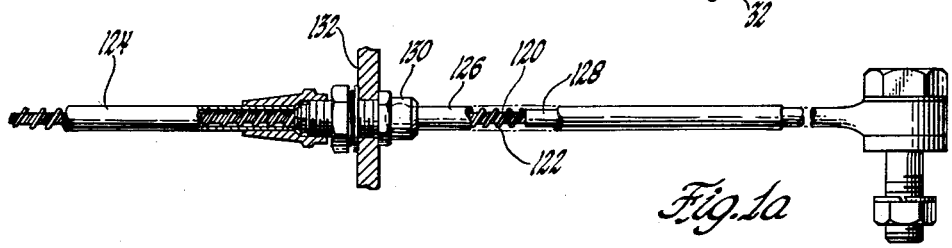
FIGURE 1a is a broken detail illustrating the nature of the connecting means employed between the valve and steering linkage.
Figure 2:
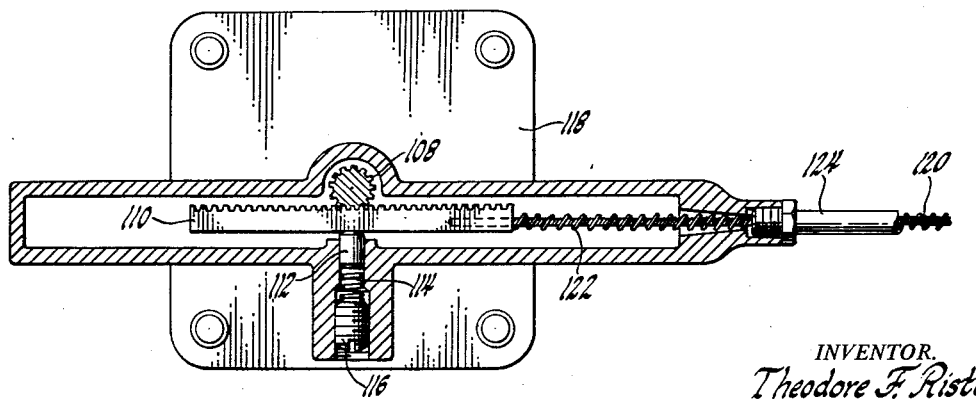
FIGURE 2 is a section on the line 2—2 in FIGURE 3.

Pinion 108 at the end of the carrier 50 meshes with a rack 110 (see FIGS. 1a and 2 as well as FIG. 3), the mating teeth being held in proper engagement by means of a plunger 112 loaded by a spring 114 reacted by a threaded plug 116. All of these parts are contained within an end plate 118 secured to the valve housing 21.

Rack 110 will be seen connected to a flexible cable 120 having a spiral winding 122 and encased within a sheath 124. At its end opposite the rack 110 the cable has connection with the bell crank device 28, more accurately, the upper component 30 of the bell crank device. The cable at such end is surrounded by rigid concentric telescoping tubes 126 and 128, the outer tube 126 being swiveled in a fixture 130 fixed in a bulkhead 132. This telescoping and swiveling, of course, is necessary by reason of the motion of the bell crank device during operation of the steering system.

The cable 120 represents a feed-back to the control valve, more specifically, to the outer valve sleeve element 54 which, as aforenoted, is connected to the pinion carrier to rotate therewith. Thus, any movement of the bell crank, which is to say any movement of the dirigible wheels, effects rotation of the sleeve element 54 and this rotation is always in the same direction the inner sleeve 46 is rotated. In other words, sleeve 54 seeks constantly to catch up with the inner sleeve 46 so that once the turning effort ceases, the valve sleeves assume a neutral position relative to each other irrespective of the angularity of the dirigible wheels.

To describe now a complete steering cycle, let us assume a right turn. On such a turn the clockwise displacement of the inner sleeve 46 carries lands 60 and 62 (FIG. 5) to positions whereat port 74 is closed to pressure port 88 and port 88 is substantially fully open to power port 80. The latter port, as above described, opens to groove 82 in sleeve 54 and such groove communicates in turn with the power line 98 leading to the lower chamber (FIG. 1) of the fluid motor 22. As a consequence, the piston 36 is forced upwardly to swing the dirigible wheels 38 as required. This movement of the piston is accompanied by the exhaustion of fluid from the upper chamber of the fluid motor, the flow of the exhaust fluid being through the conduit 96, annular groove 76 in the sleeve 54, port 74 in such sleeve, channel 72 therein, port 68 in sleeve 46, spring chamber 90, port 92 in the valve body and conduit 94.

Leftward swinging of the dirigible wheels 38 is necessary, of course, for a right turn, such wheels being located at the rear of the vehicle. This movement is translated to the cable 120 through the bell crank device, the cable being caused to move in the direction resulting in clockwise rotation of the pinion carrier 50 and the outer sleeve element 54. Once the desired angulation of the dirigible wheels has been achieved and the manual effort imposed at the steering wheel 12 is stopped the sleeves 46 and 54, as aforeindicated, assume their normal relative positions (FIG. 5) and the pressure unbalance across the piston 36 no longer obtains. The particular system is irreversible, which is to say that the operator must steer the dirigible wheels back to their straight-ahead position.

It is believed that the description herein of a left turn is unnecessary, the action being just the reverse of that described above. Thus the sleeve 46 is rotated oppositely and cable 120 pulls instead of pushes rack 110, the sleeve 54 consequently being caused to rotate in the same direction as sleeve 46.

It should be brought out that in the event of an hydraulic failure cable 120 is spared damage by the friction clutch 16 which throws out when the manual force continues to be applied after the clearance between the yoke portion of the carrier 50 and the enlarged end portion of the stub shaft 18 (FIG. 4) has been taken up.

What is claimed is:

1. Steering apparatus for a vehicle comprising manually manipulated steering means and a steering linkage actuated through a bell crank device, said apparatus including a source of fluid pressure, a fluid motor operably connected to said bell crank device and a rotary, follow-up valve controlling fluid flow between said pressure source and said motor, said valve incorporating inner and outer sleeve members one of which is actuated by said manually manipulated means the other of which has operable connection with said bell crank device through a flexible sheathed cable, said sheathed cable at its end connected to said bell crank device being surrounded by a pair of rigid telescoping tubes the outer of which has a swivel connection in a fixed support.

2. Apparatus according to claim 1 where the flexible sheathed cable has a rack and pinion connection with said other of said sleeve members.

References Cited in the file of this patent
UNITED STATES PATENTS

| | | |
|---|---|---|
| 1,657,412 | Schneider | Jan. 24, 1928 |
| 2,193,898 | Carter et al. | Mar. 19, 1940 |